J. N. JOHNSON.
CAMERA ATTACHMENT.
APPLICATION FILED JAN. 3, 1912.
1,053,400.
Patented Feb. 18, 1913.
2 SHEETS—SHEET 1.
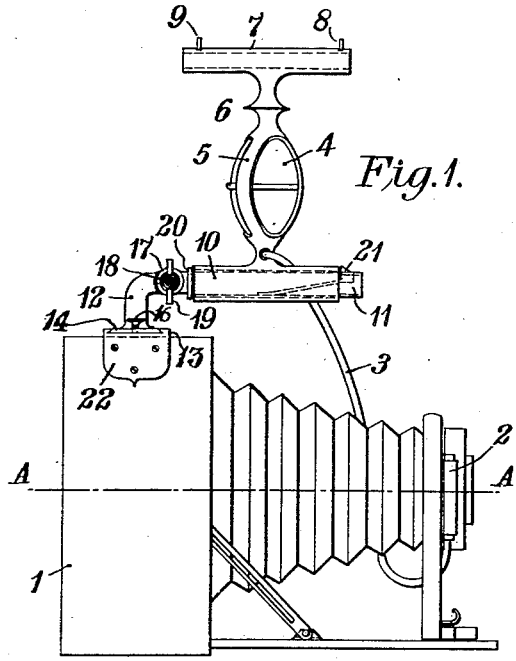
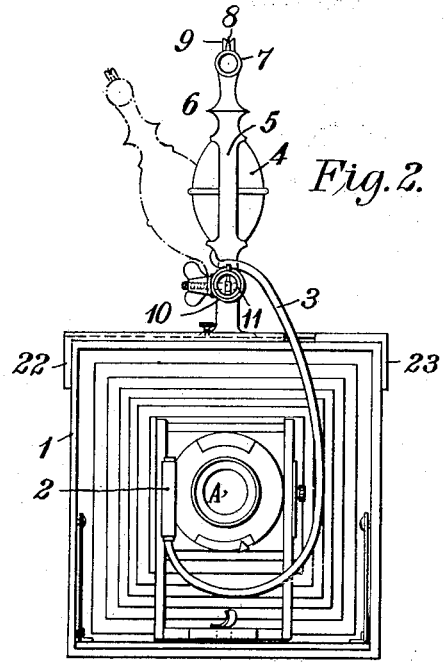
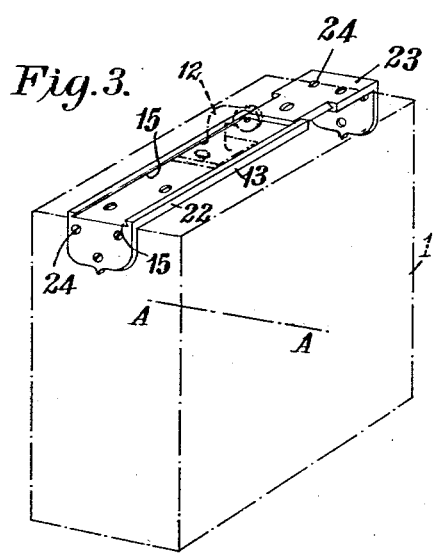
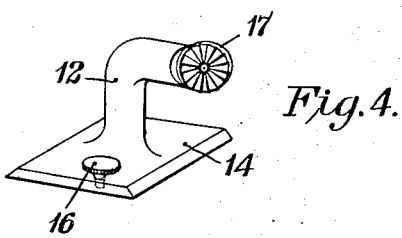
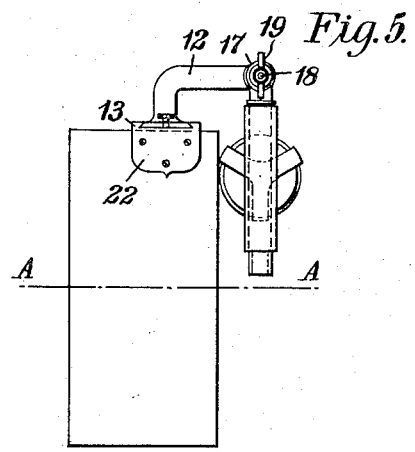
Witnesses:
C. L. Belcher
Chas P Hidden
Inventor
John N. Johnson
By his Attorneys

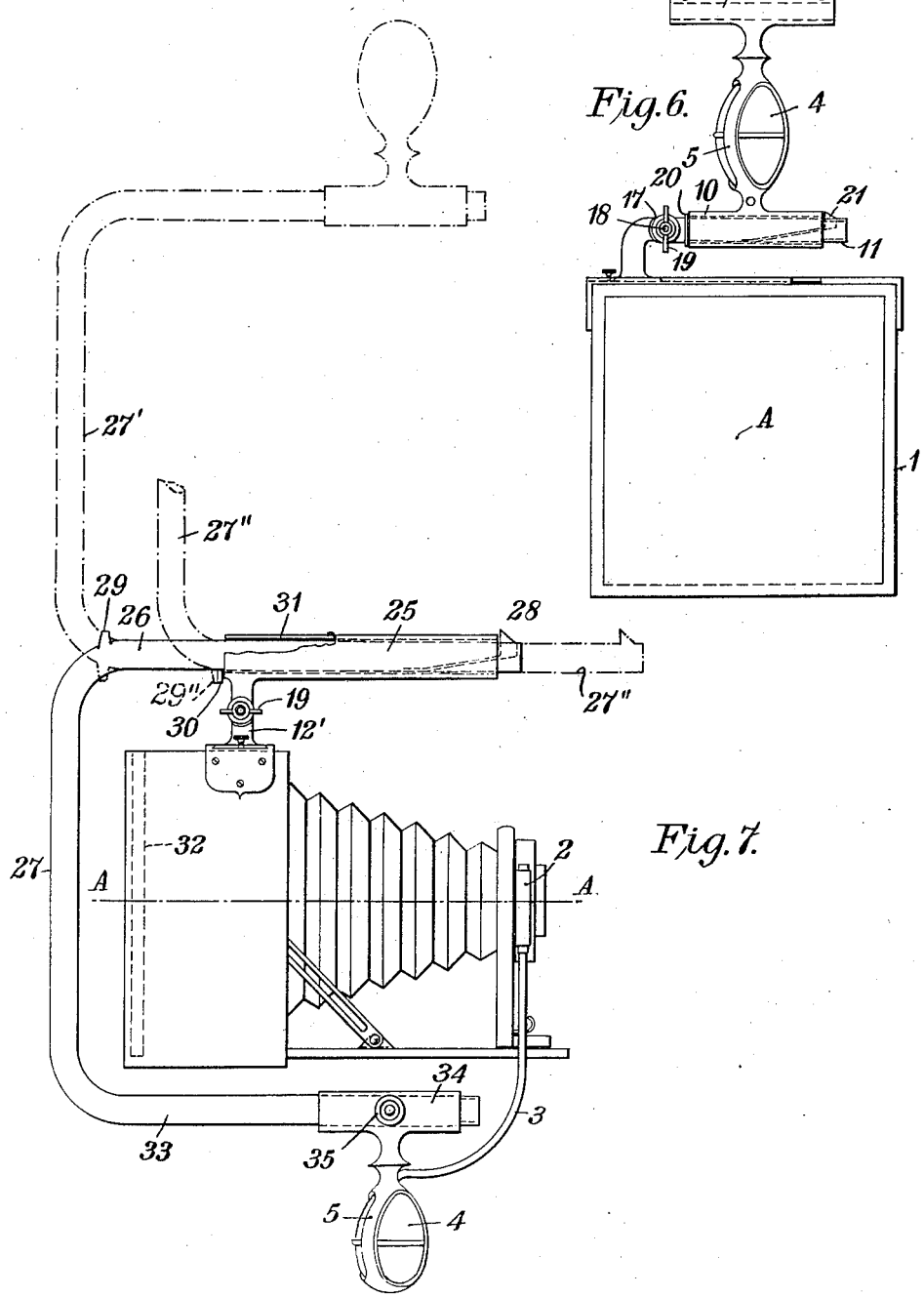

UNITED STATES PATENT OFFICE.

JOHN N. JOHNSON, OF ALBUQUERQUE, NEW MEXICO.

CAMERA ATTACHMENT.

1,053,400.  Specification of Letters Patent. Patented Feb. 18, 1913.

Application filed January 3, 1912. Serial No. 669,245.

*To all whom it may concern:*

Be it known that I, JOHN N. JOHNSON, a citizen of the United States, residing at Albuquerque, in the county of Bernalillo and State of New Mexico, have invented certain new and useful Improvements in Camera Attachments, of which the following is a full, clear, and exact description.

This invention relates to an attachment for cameras and has for one of its objects the provision of a novel suspension whereby the camera may be operated with one hand while the picture is taken at the most advantageous moment.

Another object of my invention is to render unnecessary the use of a view finder.

A still further object is to so suspend a camera that it shall automatically plumb or level itself.

These and other objects of my invention will be hereinafter referred to and the novel elements and combinations of elements whereby they are attained will be more particularly set forth in the appended claims.

In the drawings which form a part hereof and in which like reference characters designate like parts throughout the several views: Figure 1 is a side elevation of one form of my invention. Fig. 2 is a front elevation of the same. Fig. 3 is a detail of a construction employed in the device shown in Fig. 1. Fig. 4 is a detail perspective of a bracket used in connection with the device shown in Fig. 3. Fig. 5 is a side elevation of a camera with a supporting structure similar to that shown in Fig. 1; the support being disposed in folded position. Fig. 6 is a front elevation of a camera with the support disposed thereon in position to serve as a handle for said camera. Fig. 7 is a side elevation of a camera provided with a modified form of support.

I am aware that numerous modifications and changes in structure may be made without departing from the spirit of my invention, and I hence desire to be limited only by the scope of the claims appended hereto.

Referring to Fig. 1, the camera therein shown has been designated 1; said camera being of the usual folding type. The shutter, in this instance, is pneumatically actuated in a well known manner, compressed air being delivered to the actuating mechanism 2 through a flexible tube 3 which is in communication with a bulb 4, or the like disposed in a frame or casing 5. This casing forms part of a camera supporting structure or frame, broadly designated 6, which comprises a cross-bar 7, preferably tubular, for lightness, which is provided with sights 8—9, one adjacent either end thereof, the purpose of which will be hereinafter disclosed. The lower portion 10 of the supporting structure may also be tubular, and extends in parallelism with the sight bearing part 7. The supporting structure, as a whole, is preferably hingedly mounted, the tube or sleeve 10 being adapted for the reception of a laterally directed stud 11. I prefer to connect this stud to the camera by means of a goose-necked bracket 12 and a guide-way 13 for said bracket. The bracket 12 is provided with a square base 14, the edges of which are beveled for engagement with the under cut walls 15 of the guide-way. A thumb nut 16 in this base serves to lock the bracket firmly in position in its guide-way, no matter which set of edges of the square base are in engagement with the walls 15 just referred to. When the device is disposed in its sighting position, the goose neck will be directed as shown in Figs. 1 and 2. The laterally directed end of this goose neck is preferably enlarged, as at 17, and one face thereof may be serrated as shown. The inner end of the stud 11 is correspondingly enlarged and has a face thereof adapted for locking engagement with the head 17 in any known manner. For convenience of description I shall term the line A—A passing substantially through the center of the lens and through the center of the picture projected upon the film or plate in the camera, the axis of the camera. A clamping bolt 18 and a thumb nut 19 provide means for drawing these parts firmly together and by reason of the joint so formed the stud or hinge element may be directed angularly with respect to this camera axis or it may be held parallel thereto. I prefer, however, that movement of this element shall be confined to a plane which is normally vertical, and which passes through the said camera axis. The stud 11 is provided with a collar 20, adjacent its inner end, and a spring pressed latch 21 at its outer end, which hold the hinging sleeve 10 against longitudinal displacement with respect to the stud.

The bulb casing 5 constitutes a handle by means of which the attachment and the camera affixed thereto may be supported. I prefer to form the sights 8—9 upon the sight bar or barrel 7, like those commonly used on gun barrels, so that the camera may be aimed at any object accurately and expeditiously. When the sights, and the object are in alinement the camera axis will normally pass through the object immediately below the line of sight, so that by merely sighting at an object it is made the center, substantially, of the picture to be taken. This, of course, obviates the necessity for using a view finder of the ordinary description. Once the object has been alined with the sights, the same hand which sustains the weight of the camera, and sights it, may be used to snap the picture. In the particular form of device shown the means employed to accomplish this end are pneumatic but it is obvious that any suitable means may be employed for manipulating the shutter. It will be observed also that even though the handle be held other than perpendicular, as, for example, shown by dotted lines in Fig. 2, the camera will, under the influence of gravity swing plumb; thus invariably bringing the sides of the picture which are parallel to the top and bottom of the camera, truly horizontal. In other words, the novel supporting attachment herein exemplified really comprises means whereby gravity may level the camera in one direction, at least. Should it be desired to remove the handle, it is merely necessary to depress the latch 21 and slide the sleeve 10 off from the stud.

The guide-way 13 is preferably made in two parts 22—23 which have a slidable engagement with each other so that various sizes of camera may be accommodated, each of these parts further being secured to the camera case or box, as by means of screws 24. Further, the bracket 12 may readily be removed and when turned through 90° may have the base thereof reinserted into the guide-way in the manner illustrated in Fig. 6. In this position the barrel or sight bar 7 itself serves as a handle which is conveniently disposed for carrying the camera with the side thereof adjacent the leg of the bearer.

It is not essential that the guide-way be disposed centrally upon the camera case, as shown in Fig. 1, since it may be placed to one side of the center as in Fig. 5. If the parts be properly proportioned, the stud, together with the sighting handle mounted thereon, may be swiveled down alongside of the case into, what may be termed, a folded position.

In Fig. 7, I have shown a somewhat different arrangement. Indeed, for small cameras, in some cases, this may be preferred. Herein the bracket 12' is mounted in a guide-way 13, as before, since this is a desirable feature, but the neck of the bracket is straight and extends at right angles to the base and it is directly attached to a sleeve 25, through which extends one arm 26 of a laterally directed U-shaped frame, broadly designated 27. The bracket 12' is attached to sleeve 25 in the same manner as are the corresponding parts in the construction heretofore described. The latch 28 secured in the end of this arm serves a dual function, in that it also constitutes the forward sight. The rear sight 29 is preferably formed integral with the arm 26. When held as shown in full lines in Fig. 7, the sleeve 25 is held against rearward longitudinal movement with respect to the supporting frame 27 by means of a projection 30, but the upper side of the sleeve is slotted, as at 31, for the reception of this projection, so that when the frame is inverted, as shown by dotted lines 27', it may be pushed forwardly into the position indicated by dotted lines 27''. This permits of the plate holder 32, in the back of the camera case, being withdrawn upwardly, if the camera happens to be so constructed. It will be noted that the rear sight 29 serves as a stop in this case, when it occupies the position designated 29''. A clamping connection with thumb nut 19 may be employed in this construction between the sleeve 25 and bracket 12', similar to that previously described. The remaining arm 33 of the U-frame carries a sleeve 34 similar to sleeve 10; and in fact it may be of identically the same size, so as to be replaceable thereby. Sleeve 34 is provided with a thumb screw 35, to lock it against rotation with respect to the frame, so that both the frame and the camera may be supported from the handle or bulb casing 5, in either the position shown in full lines, or in dotted lines 27'. In either case the camera is free to swing laterally with respect to the frame, and to thereby plumb itself.

My attachment enables a camera to be aimed at an object in much the same fashion that one aims a pistol or rifle and the picture may hence be taken more accurately and expeditiously than with the usual view finder. The bulb or other device used for actuating the shutter may, by reason of its proximity to the handle, be regarded as corresponding to the trigger of a pistol or rifle.

Whether the sight bar be pointed upward or downward the camera will automatically plumb itself in the manner of a plumb bob so that, normally, the bottom of the sensitized plate or film will always be horizontal.

If the handle 5 be mounted adjustably with respect to the length of the member to which it is attached, as shown in Fig. 7, it may be so disposed with respect to the camera that the center of gravity of the entire device will be substantially directly above the point of support, a feature of considerable importance.

In general, I believe that I am the first to make a self-leveling, sight, snap-shot camera attachment and hence desire to protect my invention as broadly as possible.

Having described my invention, I claim:

1. A camera attachment comprising a substantially rigid support for a camera, and a normally free hinge connection between said camera and said support, said support being provided with sighting parts, said camera being separable from said support.

2. A camera attachment comprising a substantially rigid supporting frame for a camera having a handle forming part, said handle forming part being provided with sighting parts and a normally free, pivotal connection between said camera and said frame.

3. A camera attachment comprising a support for a camera, a normally free pivotal connection between said camera and said support, and means for controlling the camera shutter connected to said support.

4. A camera attachment comprising a combined sighting and supporting structure, connecting means for pivotally suspending a camera below a portion of said structure, and pneumatic shutter-controlling means carried by said structure.

5. A camera attachment comprising a combined sighting and supporting structure having a recessed handle forming part, and a shutter controlling device having a portion thereof, at least, disposed within the recess in said handle forming part.

6. A camera attachment comprising a shutter controlling device, a recessed handle within which a portion, at least, of said device is disposed, said device being accessible to the fingers when said handle is grasped, and supporting connections for attaching said handle to a camera.

7. A camera attachment comprising a shutter controlling device, a recessed handle within which a portion at least of said device is disposed, said device being accessible to the fingers when said handle is grasped, and supporting connections including a freely movable hinge element for attaching said handle to a camera.

8. A camera attachment comprising a supporting frame adapted to be carried by hand, a bracket pivotally connected to said frame, means whereby said bracket is adapted to be secured to a camera, and sights carried by said frame, a line connecting said sights being normally substantially parallel to the axis of the camera.

9. In combination, a camera, and a supporting attachment therefor, said camera and attachment having a hinged connection therebetween, the axis of the camera being substantially parallel to the axis of the hinge connection, said attachment projecting beyond the camera.

10. In combination, a camera, and a supporting attachment therefor, said camera and attachment having a hinged connection therebetween, the axis of the camera being substantially parallel to the axis of the hinge connection, said attachment comprising two members pivotally connected together, the pivotal axis between said members extending substantially at right angles to the axis of the hinge connection aforesaid.

11. In combination, a camera, a bracket secured thereto, a member pivotally connected to said bracket, and a second member hinged to the first member, the axis of the hinge being substantially at right angles to that of the pivotal connection between the first member and the bracket, said second member having a handle and sights normally rigidly connected thereto.

12. In combination, a camera, a bracket secured thereto, a member pivotally connected to said bracket, a second member hinged to the first member, the axis of the hinge being substantially at right angles to that of the pivotal connection between the first member and the bracket, said second member having a handle and sights normally rigidly connected thereto, and means adjacent said handle, and operable by the hand which grasps the same for controlling the shutter of said camera.

In witness whereof, I subscribe my signature, in the presence of two witnesses.

JOHN N. JOHNSON.

Witnesses:
 WILLIAM WATSON,
 M. E. HICKEY.